Jan. 6, 1925.

E. P. MANTZ 1,522,019

DOUBLE BEARING BALL COMBINATION FISH BAIT

Filed Aug. 15, 1923

Inventor
E. P. Mantz

Patented Jan. 6, 1925.

1,522,019

UNITED STATES PATENT OFFICE.

EMANUEL P. MANTZ, OF FREDERICK, MARYLAND.

DOUBLE BEARING BALL COMBINATION FISH BAIT.

Application filed August 15, 1923. Serial No. 657,608.

*To all whom it may concern:*

Be it known that I, EMANUEL P. MANTZ, a citizen of the United States, residing at Frederick city, in the county of Frederick and State of Maryland, have invented certain new and useful Improvements in Double Bearing Ball Combination Fish Bait, of which the following is a specification, reference being had therein to the accompanying drawings.

This invention relates to a double bearing ball combination fish bait, and the object of the invention is the construction of a simple and efficient device, which will be positive in operation and comparatively inexpensive to manufacture.

This invention is an improvement over my prior device per my U. S. Patent, No. 716,451, issued December 23, 1902.

With the foregoing and other objects in view, my invention comprises certain novel combinations, constructions and arrangements of parts as will be hereinafter described, illustrated in the accompanying drawings, and more particularly pointed out in the appended claim.

Figure 1:
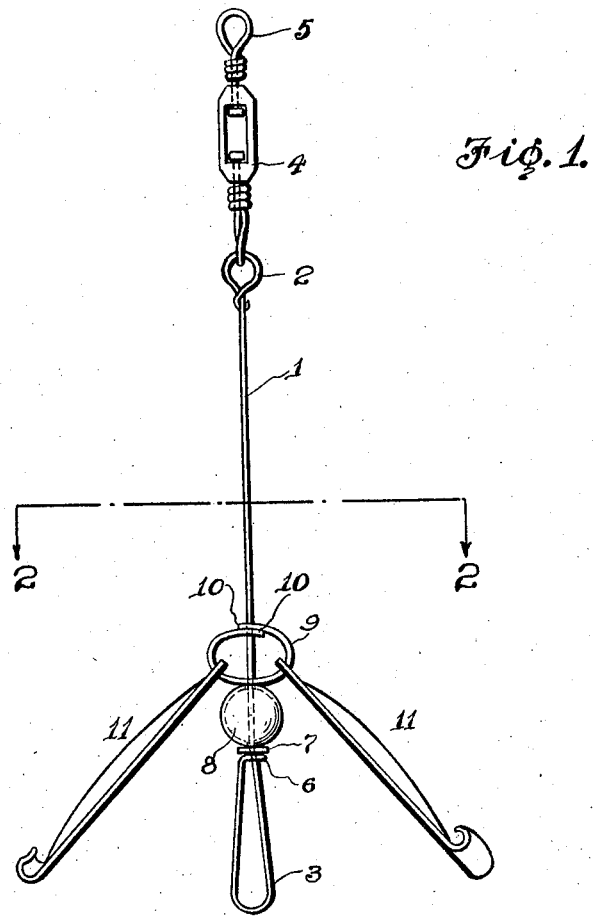
Figure 1 is a view, in side elevation, of a device constructed in accordance with the present invention.
Figure 2:
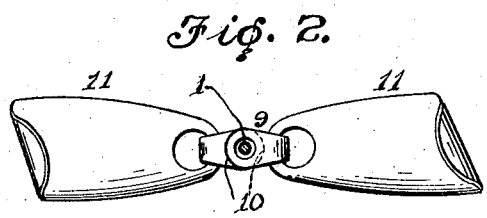
Figure 2 is a sectional view, taken on line 2—2, Fig. 1.
Figure 3:
Figure 3 is a fragmentary, perspective view of the device.

Referring to the drawings by numerals, 1 designates the shaft which is provided on its upper end with an eye 2, and on its lower end with a loop 3. Attached to eye 2 is a swivel 4, which is provided on its upper or outer end with eye 5.

The loop 3 is provided on its inner end with a flat or horizontal eye 6 upon which rests the flat washer 7. Resting upon washer 7 is ball 8. A spoon swivel 9 is mounted upon shaft 1 and rests upon the top of the ball 8. This spoon swivel 9 is formed from one piece of material, having its ends 10—10 overlapping and extending through these ends is shaft 1, Fig. 1. The lower part of the spoon swivel is free to revolve upon the top of ball 8 and the ball 8 revolves freely upon washer 7, and washer 7 revolves freely upon the horizontal eye 6, producing a very efficient device when in operation.

The trolling spoons 11 are fastened to the spoon swivel at opposite sides of shaft 1.

A hook, or hooks, of any desired type may be readily attached to loop 3. The fish line (not shown) is to be attached to the eye 5.

From practical experience with the device of this construction I have found that very satisfactory results are obtained, and the free operation of the device makes for a very efficient action in the water.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claim.

What I claim is:

An artificial bait comprising a shaft formed from a strand of wire having one end portion bent to provide a shackle receiving eye and its other end portion bent to provide an eye adapted to carry a hook and coiled about the shaft to provide a flat support, a flat washer loose upon said shaft and resting upon said support, a bearing ball loose upon said shaft and resting upon said washer, a swivel forming strip having an opening intermediate its length to loosely receive said shaft and having its end portions curved upwardly and inwardly with its ends in overlapping relation and provided with registering openings loosely receiving said shaft, and spoons having enlarged openings receiving the curved portions of said swivel.

In testimony whereof I hereunto affix my signature.

EMANUEL P. MANTZ.